United States Patent [19]

Richardson

[11] Patent Number: 4,526,721
[45] Date of Patent: Jul. 2, 1985

[54] CURING OF EPOXIDE RESINS

[75] Inventor: Frank B. Richardson, Consett, England

[73] Assignee: Thomas Swan & Co. Ltd., Great Britain

[21] Appl. No.: 508,528

[22] Filed: Jun. 27, 1983

[30] Foreign Application Priority Data

Jun. 28, 1982 [GB] United Kingdom ............... 8218625

[51] Int. Cl.$^3$ .............................................. C08G 59/54
[52] U.S. Cl. ................................. 260/404.5; 528/123; 528/341; 528/342; 564/183; 564/199
[58] Field of Search ...................... 528/123, 341, 342; 260/404.5 PA; 564/183, 199

[56] References Cited

U.S. PATENT DOCUMENTS 3,423,345 1/1969 Hsu et al. .
3,425,964 2/1969 Stanley .
4,113,597 9/1978 Rabi et al. ..................... 204/181 C

FOREIGN PATENT DOCUMENTS 576340 3/1946 United Kingdom .
917090 1/1963 United Kingdom .
1054555 1/1967 United Kingdom .
1124251 8/1968 United Kingdom .
1127556 9/1968 United Kingdom .
1437893 6/1976 United Kingdom .
1520969 8/1978 United Kingdom .
2108126A 5/1983 United Kingdom .

OTHER PUBLICATIONS

Croll, "Atmospheric Gases and the Hardening of an Amine-Cured Epoxy Coating", Jour. Coatings Technology, 1980, 52(664), 65–69.
Chemical Abstracts, vol. 93, 1980, p. 67, No. 221964q.

*Primary Examiner*—Earl Nielsen
*Attorney, Agent, or Firm*—Wood, Dalton, Phillips, Mason and Rowe

[57] ABSTRACT

The pot life of a mixture of an epoxide resin and a curing agent comprising a compound containing a plurality of amine groups is improved by carbonating the curing agent.

12 Claims, No Drawings

CURING OF EPOXIDE RESINS

This invention relates to the curing of epoxide resins and is concerned with the curing of epoxide resins using compounds containing a plurality of amine groups as curing agents.

It is well known to use compounds containing a plurality of amine groups to cure epoxide resins. This curing can take place in both solvent containing and solventless systems. Moreover, and particularly in the case where the compound containing the amine groups is an amidoamine or an imidazoline, this technology has been applied to the development of water based systems. This type of system essentially depends upon the emulsification of the epoxide resin in water. Such systems are advantageous in that they are non-inflammable, they do not use costly solvents, The emulsion is normally prepared in one of two ways. Firstly it can be prepared by dissolving the amine group containing compound in water to give an aqueous solution. This can, if required, contain a proportion of solvent preferably a hydrophilic solvent. The amine group containing compound can be designed (and often is) to act as the emulsifying agent for the epoxide resin as well as to cure the epoxide resin. However, if necessary an external emulsifier can be added to either the amine group containing compound or the epoxide resin to assist or effect emulsification when the epoxide resin and said compound are mixed. Once emulsification occurs the material is ready for use, for example, to form a continuous film on a substrate such as glass, metal, wood, cement, ceramic, or plastics. Secondly, the emulsion can be prepared by firstly emulsifying the liquid epoxide resin in water to form a low viscosity stable emulsion. This is then mixed with an aqueous solution of the amine group containing compound and the system is then ready to be applied as before.

It is well known that these emulsions of epoxide resin and amine group containing compound are not particularly stable and that the breaking of the emulsion occurs quite soon. At this stage, it is impossible to apply the material to form a single continuous phase. The useable life of these systems is often referred to as the "pot life" and systems which show instability after a short time are referred to as having a "short pot life". Some attempts have been made to improve the stability of these emulsions and although the stability can be improved a little, this improvement is always associated with a deterioration in film properties. More particularly, the gloss of the film becomes poorer as the end of the pot life becomes nearer. This is not, however, always detectable at the time. This emulsion instability is a serious disadvantage of water based systems especially when compared with more conventional systems based on epoxide resin/amido amine solutions in inflammable solvents which are much more stable and therefore have a longer useable life.

It is one object of the present invention to improve the pot life of systems comprising epoxide resins and amine group containing compounds for curing the same.

It is a further object of the present invention to provide systems which are based on epoxide resins and compounds containing amine groups for curing the same and which have improved film forming properties.

These objects are achieved by carbonating the curing agent.

According to one aspect of the present invention there is provided a method of curing an epoxide resin which comprises using a curing agent which comprises a compound containing a plurality of amine groups and which has been carbonated.

According to another aspect of the present invention there is provided a curing agent for an epoxide resin which is the product obtained by carbonating a compound which contains a plurality of amine groups.

The carbonation treatment in accordance with the present invention enables the useable pot life of compositions comprising an epoxide resin and an amine-group containing compound for curing the same to be increased without any significant deterioration in the properties, such as gloss, clarity, hardness and water sensitivity of the resultant film. Indeed, in contrast to conventional water based epoxide resin/amine group containing compound systems, no reduction in film gloss occurs towards the end of the pot life.

It is believed that the carbonation treatment causes carbon dioxide to react to a varying extent, with the free amine groups to give an amine carbonate or other derivative. The extent or level of this reaction is selected in dependence upon the actual pot-life requirements. The reaction effectively blocks the amine groups so that, when mixed with the epoxide resin or with the emulsion of the liquid epoxide resin and water, there is a delay before the amine groups and epoxide groups react together. The resultant extension of pot life may be of the order of 5 times the pot life of the untreated material. It would seem that once the composition is applied as a film, carbon dioxide is caused to be liberated leaving the amine groups to cure the epoxide resin in the normal manner. The carbonation treatment of the amine group containing compound can be a separate operation and can be effected by contacting the compound with liquid, solid or gaseous carbon dioxide. The rate and efficiency of the reaction of carbon dioxide can be effected by variation in temperature within the range of 0°–100° C. and preferably between 10° and 40° C. and use of pressure. The degree of carbonation required to effect the increase in pot life depends upon the actual pot life requirements and the amine content of the amine group containing compound. For example, when the carbonisation is effected using carbon dioxide, the amount of carbon dioxide used may be from about 0.1 to about 50% by weight of the compound and a typical relationship between level of carbonation and pot-life is as follows:

| % CARBON DIOXIDE ADDED | POT LIFE (HRS) |
| --- | --- |
| 0 | 1.00 |
| 4.0 | 2.25 |
| 5.0 | 3.75 |
| 7.4 | 5.00 |
| 8.6 | 7.25 |
| 9.0 | 8.00 |
| 9.6 | 9.50 |
| 10.0 | 16.00 |

The carbonated compound is very stable at ambient temperatures.

Although the carbonated compounds of the present invention are particularly suitable for use in curing epoxide resins in aqueous media, they can also be used to cure epoxide resins in solvent based systems. For example, by using a carbonated polyamide adduct (containing about 3% by weight of $CO_2$) to cure an epoxy resin in a mixture of polar solvents, the pot life has been increased from about $3\frac{1}{2}$ hours to about 24 hours.

The amine group containing compound is preferably a monomeric or polymeric amido amine or imidazoline or derivative thereof. These amido amines/imidazolines are known epoxide resin curing agents and are based on reactions between an acid component and an amine component. Suitable acid components are saturated monomeric acids, unsaturated monomeric acids, epoxidised unsaturated acids, dimerised and trimerised acids, polymeric acids and the glycerides or other esters of such acids. Typical examples of the acids which may be used are adipic acid, azelaic acid, abietic acid, naphthenic acid and particularly fatty acids such as palmitic acid, stearic acid, oleic acid, elaidic acid, linolenic acid, linoleic acid, ricinoleic acid, eleostearic acid and mixtures thereof. Typical sources of such acid components are tall oil, linseed oil, soya bean oil, caster oil, tallow, rape seed oil, and rosin. The use of caster oil and other non-drying or semi-drying oils contributes better initial colour and better non-yellowing properties. Typical examples of suitable amine components are ethylene diamine, diethylene triamine, triethylene tetramine, tetra ethylene pentamine, penta ethylene hexamine, and derivatives of amines such as amino propyl ethylene diamine. Alternatively, polyamines such as those described above or derivatives of such polyamines including vinyl amine compounds may be used as the amine group containing compound. The amido amines and polyamines can be further modified with small amounts of epoxide resin to give so-called adducts or with other materials which result in improved emulsifiability or dispersibility in water. These modified products can also be used as amine group containing compounds in accordance with the present invention.

The epoxide resins with which the curing agents of the invention are used will ordinarily be liquid polyepoxides containing more than one epoxide group per molecule. Such polyepoxides are the polyglycidyl ethers of aromatic or aliphatic polyhydric compounds for example resorcinol, hydroquinone, pyrocatechol, bisphenol A, bisphenol F, glycerol, pentaerythritol, mannitol, sorbitol and trimethylol propane. The most suitable polyepoxides are those based on the reaction between bisphenol A or F with epichlorhydrin. Mixtures of polyfunctional epoxides and monofunctional epoxides can be used if desired.

If it is desired to reduce the drying time when curing epoxide resins in accordance with the present invention, suitable catalysts, for the curing reaction, such as a phenol amine, may be included. For example from 1 to 5% of 2, 4, 6-tris(dimethyl amino methyl) phenol has been found to be effective.

The following Examples illustrate the invention.

EXAMPLE 1

400 gms of a modified polyamidoamine derived from linseed stand oil and petaethylene hexamine were charged into a glass reactor vessel. 400 gms of water were added and the whole was stirred until dissolution had occurred. The contents were warmed to 35° C. and carbon dioxide gas was fed into the glass vessel under the liquid level with stirring. This was continued until the increase in weight of the product was about 5%.

200 gms of the carbonated product were mixed with 100 gms of water to form a homogenous solution. This was then mixed with 150 gms of an epoxide resin, having an epoxide equivalent weight of 190 and derived from bisphenol A and epichlorhydrin, to form an emulsion. The emulsion has a useable pot life of approximately 6 hours compared to a pot life of $1-1\frac{1}{2}$ hours for a system which did not include the carbon dioxide treatment but which was otherwise identical. The emulsion was used to form a film. There was no reduction in gloss of the film prepared towards or at the end of the pot life of the emulsion.

In a further experiment, 23.4 gms of the carbonated product were mixed with 43.6 gms of water to form a solution. This was then mixed with 33 gms of a pigment base to form an emulsion. The pigment base had the following composition:

Epoxide resin—44.5 g
Monoepoxide diluent—2.5 g
Titanium dioxide—27.0 g
Blanc Fixe (Filler)—23.5 g
Flowing agent—2.5 g The epoxide resin had an epoxy equivalent weight of 200 and was based on bisphenol A and epichlorhydrin. The emulsion has a useable pot life of 10–12 hours compared to a pot life of 2 to $2\frac{1}{2}$ hours for a system which did not include the carbon dioxide treatment but which was otherwise identical. The emulsion was used to form a film which had a consistent gloss i.e. there was no reduction in gloss towards the end of the pot life.

EXAMPLE 2

400 gms of a modified amido amine based on linseed oil and diethylene triamine were charged into a glass reactor vessel. 400 gms of water were added with stirring until dissolution occurred. The contents were warmed to 40° C. and carbon dioxide gas was fed into the glass vessel under the liquid level with stirring until the product had increased in weight to the extent of about 3%. An aqueous emulsion of the product and an epoxide resin had an improved pot life and a film produced therefrom had a consistent gloss.

EXAMPLE 3

Example 2 was repeated using a modified amidoamine based on soya bean oil and tetra ethylene pentamine and similar results were obtained.

EXAMPLE 4

400 gms of a modified polyamide similar to that used in Example 1 were dissolved in 400 gms of water with stirring. This solution was then warmed to 35°–40° C. and 'dry-ice' added in portions and allowed to 'react' until the increase in weight was of the order of 3%. When this carbonated material was used to cure an epoxide resin, a pot life of approximately 5 hours was obtained.

EXAMPLE 5

Example 4 was repeated except that instead of using dry ice, the polyamide was carbonated by introducing liquid $CO_2$ into the solution under the surface. Similar results were obtained.

EXAMPLE 6

53 parts by weight of Antarox CO990, 17 parts by weight of Antarox CO210, and 2210 parts by weight of water were heated to 50° C. with stirring. (Antarox CO210 and Antarox CO990 are nonyl phenol ethylene oxide condensates). 2280 parts by weight of an epoxide resin having an equivalent weight of 180 to 200 and derived from bisphenol A and epichlorhydrin were preheated to 70° C. and then fed in with rapid stirring. The mixture was allowed to cool to room temperature and was then processed through a colloid mill using a 0.004 inch (0.1 mm) gap. 100 gms of the resultant emulsion was mixed with 75 gms of the carbonated product of Example 1 and a further 50 gms of water were added. The mixture was stirred until homogenous and was found to have a pot life of more than 5 hours.

EXAMPLE 7

133.2 parts by weight of titanium dioxide, 150 parts by weight of the carbonated product used in Example 1, and 201.7 parts by weight of water were ground to Hegmann Gauge 7. To the resultant material there were added 200 parts by weight of pre-emulsified epoxide resin prepared as in Example 6 and the whole was mixed together well. The resultant gloss paint was formed into a film which was touch dry in 3.75 hours and tack free in 11.5 hours. The pot life of the paint was 8 hours.

EXAMPLE 8

28.0 parts by weight of titanium dioxide, 18.6 parts by weight of Blanc Fixe, 2.0 parts by weight of black iron oxide, and 69.7 parts by weight of pre-emulsified epoxide resin prepared as in Example 6 were ground together to Hegmann Gauge 7. 52.3 parts by weight of the carbonated product used in Example 1 and 50.3 parts by weight of water were added and the mixture was stirred throughly. A film of the resultant gloss paint was touch dry in 3.5 hours and tack free in 12.0 hours. The pot life of the paint was 8.5 hours.

The experiment was repeated except that the modified polyamidoamine of Example 1 was used as the curing agent instead of the carbonated product. The pot life of the resultant paint was about 2 hours.

EXAMPLE 9

223.0 parts by weight of titanium dioxide, 148.0 parts by weight of blanc fixe, 150.0 parts by weight of the carbonated product used in Example 1, and 225.0 parts by weight of water were ground together to Hegmann Gauge 7. 200.0 parts by weight of the pre-emulsified epoxide resin of Example 6 were added and the mixture was stirred thoroughly. A film formed from the resultant undercoat paint was touch dry in 2.5 hours and tack free in 8.0 hours. The pot life of the paint was 8.0 hours.

EXAMPLE 10

133.2 parts by weight of titanium dioxide, 147.75 parts by weight of the carbonated product used in Example 1, 2.25 parts by weight of 2, 4, 6—Tris (dimethyl amino methyl) phenol, and 201.7 parts by weight of water, were ground together to Hegmann Gauge 7. 200 parts by weight of the pre-emulsified epoxide resin of Example 6 were added and the mixture was stirred thoroughly. A film formed from the resultant gloss paint was touch dry in 3.25 hours and tack free in 7.5 hours. The pot life of the paint was 6 hours.

EXAMPLE 11

300 gms of a modified polyamido amine derived from castor oil and tetraethylene pentamine (reacted in a ratio of 1.33:1.0) were charged into a glass reactor. 300 gms of water was added with stirring until dissolution occurred. The solution in the reactor was warmed to 35° C. and carbon dioxide was gas introduced under the surface of the solution with stirring until the weight of the product had increased by about 4%.

The carbonated product obtained was used to cure an epoxide resin in aqueous media. The mixture had an improved pot life and a film of excellent colour and consistent gloss was obtained.

EXAMPLE 12

300 gms of a modified polyamino imidazoline (obtained by reacting tall oil fatty acid and penta ethylene hexamine in a ratio of 1.25:1.0 at a temperature of 250° C. for 3 hours followed by vacuum distillation to remove water and unwanted amine) were charged into a glass reactor with 300 gms of water and stirred until dissolution. The solution was treated with carbon dioxide in the manner described in Example 11 until the weight increased by about 4%.

An aqueous emulsion of the carbonated product and an epoxide resin had an improved pot life.

I claim:

1. A method of producing a curing agent for an epoxide resin which comprises the steps of:
    forming an aqueous solution by dissolving in water an amidoamine or an imidazoline formed by reacting together an acid component and an amine component; and
    carbonating the amidoamine or amidazoline by contacting the solution with carbon dioxide to obtain the desired curing agent.

2. A method according to claim 1 wherein the acid component is a fatty acid or ester thereof.

3. A method according to claim 2 wherein the fatty acid is ricinoleic acid.

4. A method according to claim 1 wherein the amidoamine or imidazoline is carbonated by contacting the solution with carbon dioxide gas.

5. A method according to claim 1 wherein the amidoamine or imidazoline is carbonated by contacting the solution with solid carbon dioxide.

6. A method according to claim 1 wherein the amidoamine or imidazoline is carbonated by contacting the solution with liquid carbon dioxide.

7. A method according to claim 1 wherein the amount of carbon dioxide used is from 0.1 to 50% by weight of the amido amine or imidazoline.

8. A method of producing an agent for curing an epoxide resin without heating thereof which comprises the steps of:
    forming an aqueous solution by dissolving in water a compound containing a plurality of amine groups other than tertiary amine groups forming an epoxide resin curing agent when carbonated; and
    carbonating the compound by contacting the solution with carbon dioxide to obtain the desired curing agent.

9. A method according to claim 8 wherein the compound is carbonated by contacting the solution with carbon dioxide gas.

10. A method according to claim 8 wherein the compound is carbonated by contacting the solution with solid carbon dioxide.

11. A method according to claim 8 wherein the compound is carbonated by contacting the solution with liquid carbon dioxide.

12. A method according to claim 8 wherein the amount of carbon dioxide used is from 0.1% to 50% by weight of the compound.

* * * * *